Oct. 6, 1970 P. J. ZIJTA ET AL 3,532,905

DETECTION SYSTEM FOR ANALOG PULSES

Filed Dec. 20, 1967 2 Sheets-Sheet 1

INVENTORS
PETER J. ZIJTA
HEIN VAN STEENIS

BY Paul M. Brannen
AGENT

Oct. 6, 1970 P. J. ZIJTA ET AL 3,532,905

DETECTION SYSTEM FOR ANALOG PULSES

Filed Dec. 20, 1967 2 Sheets-Sheet 2

United States Patent Office
3,532,905
Patented Oct. 6, 1970

3,532,905
DETECTION SYSTEM FOR ANALOG PULSES

Peter J. Zijta, Nieuwkoop, and Hein van Steenis, Amstelveen, Netherlands, assignors to International Business Machines Corporation, Armonk, N.Y., a corporation of New York Filed Dec. 20, 1967, Ser. No. 692,146
Claims priority, application Netherlands, Feb. 28, 1967, 6703131
Int. Cl. H03k *1/18*
U.S. Cl. 307—265 7 Claims

ABSTRACT OF THE DISCLOSURE

A detection system for analog pulses for indicating selected values on the leading and trailing edges of each pulse by comparing the wave form of the pulse with a proportionately attenuated and relatively advanced or delayed version of the same pulse. The delay time or advance time is selected so that the peak value of the attenuated version of the pulse is shifted sufficiently to exactly coincide with the desired point of detection on the leading or trailing slope of the pulses. The system can employ several varieties of comparing devices.

BACKGROUND

This invention relates to detection systems for analog pulses of varying peak values, an edge of each pulse being detected at an amplitude dependent upon the pulse itself and representing a predetermined fraction, for example, one-half, of the peak value of the pulse itself.

Detection systems are known in the art which are capable of detecting predetermined points on either the trailing edge or the leading edge of pulses. These prior circuits are not suitable for the detection of both the leading edge and the trailing edge of an analog pulse for the purpose of providing an output signal indicative of the pulse width.

SUMMARY OF THE INVENTION

Briefly described, the present invention is arragned to directly compare an analog pulse wave form with the wave form of a relatively advanced and attenuated version of the same pulse. The advance time is selected so that the advanced version reaches its peak value exactly at the moment of coincidence with the leading edge of the original pulse. And/or an analog pulse wave form is compared directly with the wave form of a relatively delayed and attenuated version of the same pulse, the delay time being selected so that the delayed version departs from its peak value at the time of coincidence with the trailing edge of the original pulse.

A principal object of the present invention is to provide an improved detection system for analog pulse edges, which can be readily expanded into a system for the detection of both edges of an analog pulse. Another object of the invention is to provide detection circuits of lower cost, which is especially important for character recognition systems with many parallel scanning channels, because in this case each channel must be provided with an individual detection circuit.

According to the foregoing the invention renders it superfluous to first detect and store the peak voltage of an attenuated version of the analog pulse. At a given moment the wave form of the attenuated version of the analog input pulse reaches its peak value and owing to a relative time shift this given moment is made to coincide with the moment the leading or trailing edge of the analog pulse reaches this predetermined fraction of the peak value of the pulse itself, or in other words, said peak value of the attenuated version of the pulse itself. By direct comparison of the wave form of the analog pulse and the wave form of the time-shifted and attenuated version of the same pulse, the moment of coincidence can be determined, completing the detection of the analog pulse edge concerned.

BRIEF DESCRIPTION OF THE DRAWINGS

The invention will be further elucidated in the following by the description of some embodiments with reference to the drawings.

FIGS. 1, 2 and 3 show the block diagram of a leading edge detection system, a trailing edge detection system and a combination of the two, respectively. These block diagrams will be described first, though the essence of the invention can be reflected only partly in these block diagrams and will be entirely clear only from the timing diagram of FIG. 4.

In FIG. 1, 10 is a source of analog pulses, e.g., a scanning transducer XDR, which could form part of a system for optically scanning printed characters. Transducer 10 is equipped to receive optical energy reflected by an illuminated part of a character or of the white background and to convert it into electrical voltage or current pulses. In geneal these pulses will not meet the stringent requirements of steep edges and uniform amplitudes or peak values, desired for information pulses to be processed in digital data processing equipment. The pulses generated by transducer 10 are analog pulses and these are characterized by relatively slowly rising or falling edges and widely varying peak values. The analog pulses generated in a scanning process have a common property, however, namely that in principle the width of the leading and trailing edges of all pulses, i.e. the duration of the rising or falling edges, has a uniform value, determined by the aperture or diameter of the sensitive surface of the transducer and the relative speed at which the scanning aperture moves in respect of the character scanned. The generated analog pulses of uniform nominal rise time, generated in transducer 10, are applied to the input terminal 12 of the detection system by way of an amplifier 11.

Figure 1:
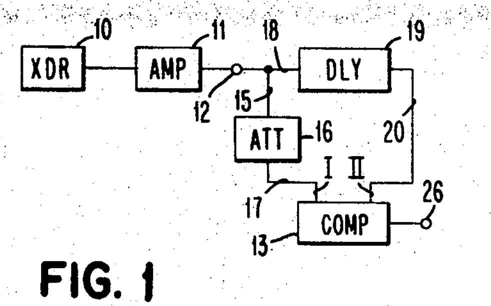
FIG. 1 is a block diagram of a leading edge detection system in accordance with a first embodiment of the invention.

Input terminal 12 is connected to two inputs I and II of a comparing circuit 13 by way of two parallel signal paths. The first signal path can be traced from input terminal 12 by way of conductor 15, attenuator 16, conductor 17, to comparing input I. The second signal path can be traced from input terminal 12 by way of conductor 18, delay unit 19, conductor 20 to comparing input II. Attenuator 16 may be, e.g. a voltage dividing resistance network. Delay unit 19 may be, e.g. an artificial delay line.

Comparing circuit 13 is adapted to continuously compare the two input voltages applied to the inputs I and II, and to generate a digital output signal indicative of the result of the comparison. This output signal is made available at the output terminal 26 of comparing circuit 13, which is also the output terminal of the detection system. Examples of preferably used comparing circuits will be dealt with later. The relation between the binary output signal of the detection system and the analog input signal will be discussed with reference to FIG. 4.

Figure 2:
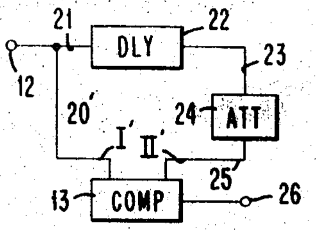
FIG. 2 is a block diagram of a trailing edge detection system in accordance with a second embodiment of the invention.

In FIG. 2 a block diagram of a detection system for the detection of the trailing edge of analog pulses has been shown as a second embodiment of the invention. The analog pulses are applied to input terminal 12 and from there to comparing circuit 13 by way of two parallel conductive paths. The first of these signal paths is constituted by conductor 20' between input 12 and comparing output I'. The second signal path can be traced form input terminal 12 by way of conductor 21, delay unit 22, conductor 23, attenuator 24, conductor 25 to input II' of comparing circuit 13. This comparing circuit is also provided with an output terminal 26 and its operation is identical to that of comparing circuit 13 in FIG. 1.

In FIGS. 1 and 2 the delay units 19, 22, respectively, are represented by a block with the same indication DLY to indicate that their construction may be the same and that their operation is identical. Likewise the blocks for the attenuators 16, 24, respectively, are provided with the same indication ATT. The comparing circuits 13 have the same indication COMP. The operation of the detection system of FIG. 2 will be discussed with reference to FIG. 4.

Figure 3:
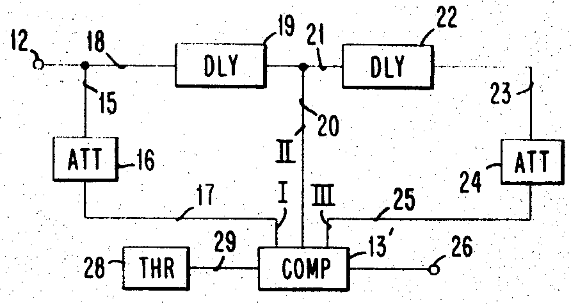
FIG. 3 is a detection system for leading and trailing edges of analog pulses constituting a combination of the embodiments in FIG. 1 and FIG. 2.

FIG. 3 shows the block diagram of a further embodiment of the invention, which constitutes a combination of the embodiments in FIGS. 1 and 2 and which, therefore, serves to detect both the leading edges and the trailing edges of analog input pulses. In this case the input terminal 12 of the system is connected by way of three parallel signal paths to three inputs of a comparing circuit 13'. The first signal path runs from input 12 through conductor 15, attenuator 16, conductor 16 to comparing input I. The second path runs from input 12 through conductor 18, delay unit 19, conductor 20, to comparing input II. The third parallel signal path runs from input terminal 12 through conductor 18, delay unit 19, conductor 21, delay unit 22, conductor 23, attenuator 24, conductor 25, to comparing input III of comparing circuit 13'. Consequently, the second and third signal paths partly coincide, both comprising conductor 18 and delay unit 19. It is further noted that the numbers I, II, III of the three comparing inputs reflects the sequence in which these inputs are reached by the same analog input pulse. An input pulse appearing at input terminal 12 is simultaneously fed in attenuated form to comparing input I, the first path causing only attenuation but no delay. At comparing input II appears an unattenuated, but somewhat delayed version of the same pulse, that is to say the input pulse, shifted one arbitrary time unit, in consequence of delay unit 19, incorporated in the second path. By way of the third signal path there appears at comparing input II an attenuated version of the same analog pulse, which however, is shifted two time units in respect of the original analog input pulse at input terminal 12, on account of the two delay units 19 and 22 incorporated in the third signal path. Consequently this attenuated version of the pulse arrives at input III one time unit later than the unattenuated pulse version arirves at input II.

In comparing circuit 13' analog input pulse version II, which is unattenuated but delayed one time unit, is compared with the versions I and III, the first (I) of which is attenuated and advanced one time unit in regard of II, the other one (III) being attenuated and delayed one time unit in respect of II. The output signal representing the result of the comparison is of a binary nature and indicates whether version II is greater than either of the two other versions (I and III) or not. Moreover, if so desired comparing circuit 13' may may be connected by way of conductor 29 to a source 28 of threshold voltage THR, that is to say a constant or, if so required, a relatively slowly varying voltage, differing sufficiently from the reference voltage of the analog pulses that noise spikes and other transient voltages do not exceed this threshold voltage. In this case the binary output signal indicates whether or not pulse version II is greater than either of the two other versions I and III and greater than threshold voltage THR. The systems of FIG. 1 or FIG. 2 might also have a threshold voltage source 28 added thereto.

Figure 4:
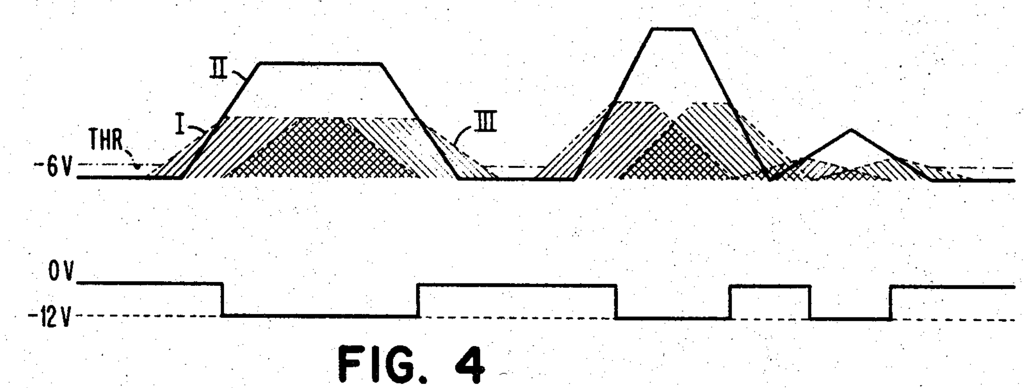
FIG. 4 is a timing diagram, showing wave forms appearing in the system according to FIG. 3.

The selection prescribed by the invention of the delay time of delay unit 19, 22, respectively, will now be elucidated with reference to FIG. 4. This shows the wave forms of the versions I, II and III of some analog pulses. It is assumed that the analog pulses have the shape of a trapezium, or, as a border-line case, the shape of a triangle. The three analog pulses shown as examples have different peak values but uniform edge widths. In this example, it is furthermore assumed that the attenuators 16, 24, respectively, supply an attenuation of 50%. In agreement therewith the delay time of delay unit 19 has been selected so that it is equal to half the uniform rise time of the three pulses. It is seen that the attenuated version I of the first analog pulse, in the drawing cross-hatched to the right as seen from below, has a peak value of half the height of the peak value of the delayed but unattenuated version II of the same pulse. Version II being delayed half the rise time, it has reached half its height the moment version I reaches its maximum height. At this moment the wave forms are coincident, that is the pulse amplitudes have become equal, and hereafter II is greater than I.

The output signal of comparing circuit 13' represented in the bottommost graph of FIG. 4 shows a transition from the inactive high level to the active low level at the time pulse version II becomes greater than each of the voltages THR, I and III at the other inputs of circuit 13'. Thus the leading edge of analog input pulse version II, delayed one time unit but otherwise true and unattenuated, has been detected at 50% of its peak level. In this detection process only the pulse versions I and II play a part, as is obvious from FIG. 4. Consequently leading edge detection is performed in exactly the same fashion by the circuit of FIG. 1, wherein upon receipt of an analog input pulse the same pulse versions I and II are generated and compared, provided also in this case the delay time of delay unit 19 and the attenuation factor of attenuator 16 are interrelated in the same way as set forth in the foregoing, in accordance with the invention.

From FIG. 4 it can furthermore be seen that at the time version I reaches its peak value and version II half the peak value, pulse version III begins to rise. Pulse version III, cross-hatched to the left as seen from below in the drawing, remains well below pulse II till the moment version III is on the point of leaving its peak level, pulse II having come already halfway its falling trailing edge in consequence of the time difference of half the nominal fall time, imposed by delay unit 22. At this moment II coincides with III, and thereafter II becomes smaller than III, the slope of II being steeper than that of III. Now the output signal again shows a sharp transition fro mthe active low level back to the inactive high level. In consequence hereof the trailing edge of pulse version II has been detected at 50% of its peak value. During this trailing edge detection only the pulse versions II and III play an active part, as can be seen from FIG. 4. Therefore trailing edge detection is performed in precisely the same fashion by the circuit in FIG. 2, in which at the comparing inputs I' and II' there appear two versions of each input pulse, showing the same interrelations as the pulse versions II and III represented in FIG. 4 as they are undelayed and delayed one time unit, respectively, provided the delay time of delay unit 22 in FIG. 2 is adjusted at half the nominal fall time of the analog input pulses and attenuator 24 supplies an attenuation of 50%.

From FIG. 4 it can furthermore be seen that also the other analog pulses given as examples are each detected on their leading and trailing edges at 50% of their individual peak values by the operation of the circuit of FIG. 3. After being delayed one time unit, each of these pulses is again compared with attenuated and relatively advanced or delayed versions of the same pulse. Thus any influence of the varying peak values is eliminated, the digital output pulses being a true reflection of the various pulse widths. The centre analog pulse is immediately followed by the right-hand pulse, without the input remaining at the reference level any longer. From FIG. 4 it can be seen that the pulse detection proceeds undisturbed all the same, so that the detection system of FIG. 3 requires no recovery time but is immediately ready for the detection of the following input pulse after detecting a pulse.

If edge detection at another level than 50% is desired, the adjustment of the delay units 19 and 22 and the attenuators 16 and 24 should be changed correspondingly. For example, for detection at 70% of the peak level of each pulse the attenuation should amount to 30% and the delay time 30% of the nominal pulse edge duration. This holds good for pulses with rectilinear edges, as represented in the drawings. In practice the pulse wave forms will be more flowing, in consequence of the relatively strong damping of the higher harmonics. Nevertheless an adjustment of the attenuators and the delay units can always be selected in accordanmce with the invention, so that the relatively advanced and attenuated pulse version I reaches its peak value at the time of coincidence with the leading edge to be detected of pulse version II and the relatively delayed and attenuated version III is on the point of leaving its peak value at the time of coincidence with the trailing edge to be detected of pulse II. The proper circuit parameters may for example be selected by fitting the transducer in a robot and by inspecting and measuring the curve of the periodically generated pulses with nominal edge widths on an oscilloscope screen.

Figure 5:
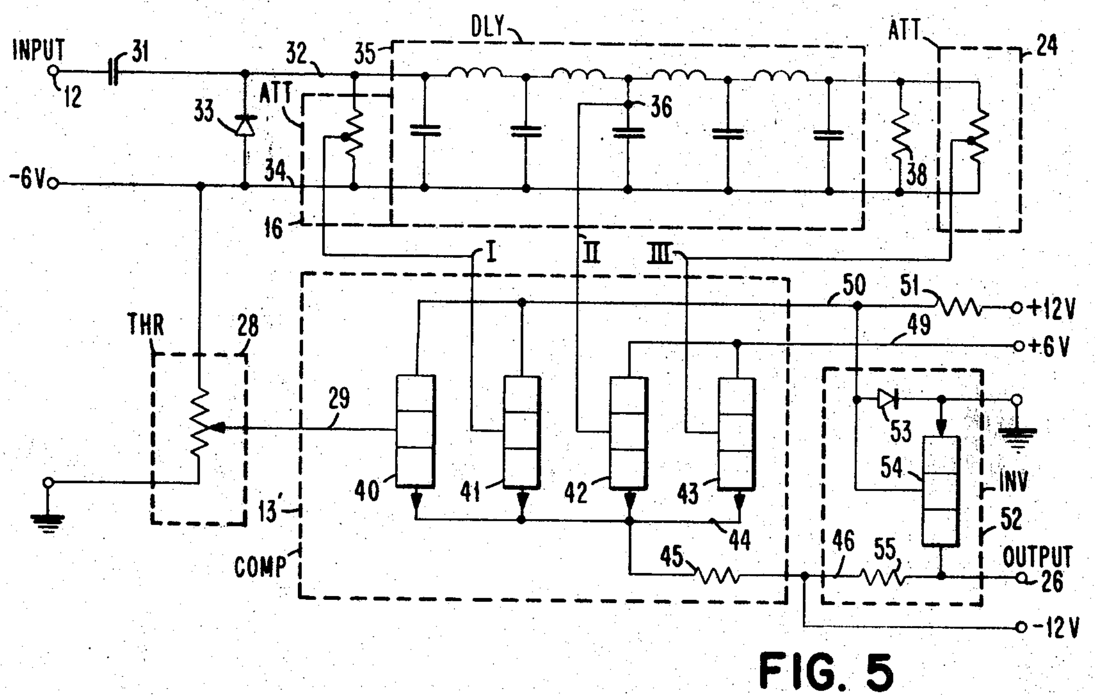
FIG. 5 is a circuit of a detection system according to FIG. 3.

The switching circuit of a detection system according to FIG. 3 is represented in FIG. 5. The input terminal 12 is connected to conductor 32 via capacitor 31. Capacitor 31 provides direct current isolation between the source of analog pulses connected to input 12 and the rest of the circuit. Conductor 32 is connected, by way of diode 33, to conductor 34, which is at −6 v. direct voltage. Thus positive going input pulses are clamped at a reference level of −6 v., whereas negative going input pulses are shortcircuited to the source of −6 v. A positive going analog pulse in conductor 32 now travels along three parallel paths to the three comparing inputs I, II and III of comparing circuit 13′. The first path is from conductor 32 through voltage divider 16 to input I. The second path runs through the first half of delay line 35 and centre tap 36 to input II. The third path runs through the whole delay line 35 and voltage divider 24 to input III. The end of delay line 35 is closed through resistor 38, in parallel with the resistor of voltage divider 24, in such a way that no energy is reflected into the line.

The comparing inputs I, II and III of COMP 13′ are connected to the base electrodes of three transistors 41, 42 and 43 respectively. The emitter electrode thereof are connected to a common conductor 44, connected, by way of resistor 45, to conductor 46, which is at −12 v. Conductor 44 is furthermore connected to the emitter electrode of a further transistor 40, the base electrode of which is connected, by way of conductor 29, to a source of threshold voltage THR, consisting of voltage divider 28 between −6 v. and ground. The collector electrode of transistor 42 is connected to +6 v. by way of line 49. The collectors of the other transistors 40, 41 and 43 are connected to +12 v. by way of a common conductor 50 and load resistor 51. Furthermore conductor 50 is connected to diode 53 and the base electrode of transistor 54. The other electrode of diode 53 is connected to ground, just like the emitter of transistor 54. The collector of this transistor is connected to the output terminal 26 and by way of resistance 55, to −12 v. The components 53–55 constitute an inverter circuit 52, indicated with INV, to be elucidated later.

Initially, when there are no input signals, the three comparing inputs I–III of COMP 13′ are all −6 v. The input 29 for the threshold voltage is at a value between 0 and −6 v., for example −5 v., which results in an effective threshold voltage of 1 v. Under these circumstances, transistor 40 has a higher control voltage applied to its base electrode than any of the other transistors 41–43. Transistor 40 is then conducting, so that the voltage on the common emitter line 44 is practically equal to the threshold voltage THR, the three transistors 41–43 being cut off. However, as soon as one of these three should receive a voltage higher than THR, the transistor concerned would become conductive, as a result of which the common emitter voltage rises accordingly and transistor 40 would be cut off. Consequently, one of the four transistors 40–43 will always be conductive. On account of the conduction of transistor 40 collector line 50 is below 0 volts. Resistor 51 is selected so that conductor 50 is a few volts negative so long as one of the transistors 40, 41 or 43 is conducting. Diode 53 is then cut off and transistor 54 is conductive, so that the output voltage is at its high level, practically zero volts. This does not change when an analog input pulse appears at input 12. When the rising edge of pulse version I exceeds the threshold voltage THR (FIG. 4), the conduction switches from transistor 40 to transistor 41, but the voltage in conductor 50 remains low and the output voltage at 26 high (0 volts).

However, as soon as the unattenuated pulse version II has become the most positive, that is just above 50% of its leading edge, transistor 42 is put into conduction so that the voltage in conductor 50 rises above zero volt, in consequence of which diode 53 become conductive and transistor 54 is cut off. Now the output voltage on terminal 26 sharply decreases to −12 v. and this condition continues until one of the three transistors 40, 41 and 43 becomes conductive and transistor 42 is switched off. This will be the case as soon as the trailing edge of pulse version II decreases below 50% of its peak value, as is evident from FIG. 4. Transistor 43 is now put into conduction, the voltage of conductor 50 decreasing again to a few volts negative. Transistor 54 is now put into conduction again, the output signal shifting to its high level. At the same moment the circuit is ready to detect a new analog input pulse, that is to say there is no recovery time required. Further, it will be obvious that the comparing circuit 13′ here described can also be used in the cases of FIG. 1, when only the leading edge of each pulse is to be detected, so that the second part of delay line 35 (in FIG. 5), attenuator 24 and transistor 43 are superfluous, or of FIG. 2, in which case only the trailing edge is to be detected, and attenuator 16, transistor 41 and the first part of delay line 35 are superfluous. It would also be possible to take an output signal from collector line 49 of transistor 42 instead of from the common collector line 50, as will be illustrated in FIG. 6.

Figure 6:
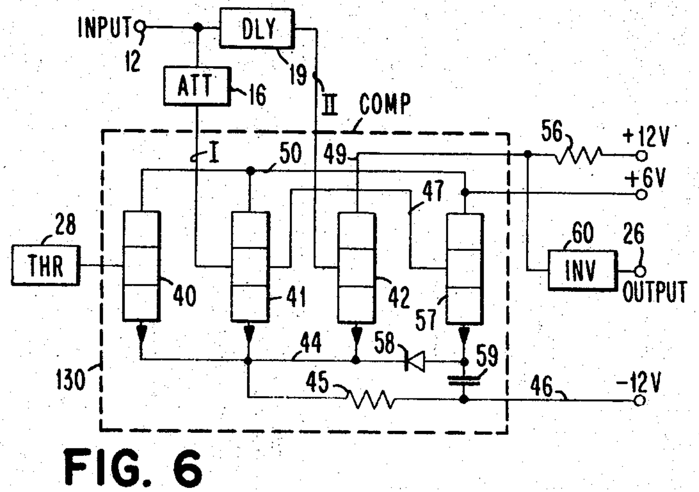
FIG. 6 is a circuit, partially in the form of a block diagram, of a third embodiment of the invention.

The pulse detection circuit in FIG. 6 is an application of the diagrammatically represented leading edge detection system of FIG. 1, the operation of which has already been described in the foregoing. The comparing circuit 130 in FIG. 6 comprises the three transistors 40, 41 and 42 and common resistor 45, described with reference to FIG. 5. However, comparing circuit 130 has been extended with the capacity to detect and store the peak level of the attenuated pulse version I, in order to be able to use this peak level again for the detection of the trailing edge of pulse II.

The base electrode of transistor 41 is connected, by way of conductor 47, to the base of transistor 57, the collector electrode of which is connected to the common collector line 50 of the transistors 40 and 41, which is at +6 volts. The emitter electrode of transistor 57 is connected, by way of diode 58, to the common emitter line 44 of the other transistors 40–42, and also, by way of capacitor 59, to conductor 46, which is at −12 volts. The collector of transistor 42 is connected to +12 volts through conductor 49 and resistor 56. Furthermore conductor 49 is connected to the input of inverter circuit 60, the output of which is connected to output terminal 26. This circuit 60 can be identical to for example the circuit INV 52 in FIG. 5.

The detection circuit in FIG. 6 operates as follows. Initially, when there is no analog input pulse, only transistor 40 is conductive. Transistor 42 being cut off, collector line 49 is at its high level, the output signal on terminal 26 being at its low level. When transistor 40 is conducting, the voltage of common emitter line 44 is substantially equal to the threshold voltage THR. On account of the polarity of diode 58 the voltage of capacitor 59 can never be higher than the voltage of line 44.

When transistor 41 goes into conduction during the leading edge of an analog pulse on input terminal 12, the voltage in line 44 follows the rising leading edge of pulse version I. Transistor 57 receives by way of line 47 the wave form of pulse version I as a control voltage, and consequently, also the voltage on capacitor 59 tending to follow wave form I rises. When the peak value of wave form I has been reached, transistor 57 ceases to conduct the current, the control voltage on the base not rising further above the emitter voltage, that is the voltage stored in capacitor 59. Diode 58 is now blocked, the voltage in line 44 following the pulse wave form II, which controls transistor 42, and thus rising above the peak voltage of pulse version I stored on capacitor 59. While transistor 42 is conducting, the voltage in line 49 is at its low level, therefore the output signal at output 26 of inverter circuit 60 is high now. Halfway the trailing edge of pulse wave form II the peak level of pulse version I is reached again and passed downward. Diode 58 is now forward biased and goes into conduction. Capacitor 59 then begins to discharge via the diode 58 and the resistor 45. The RC-time of this discharge circuit has been selected so that it is long enough for the voltage in line 44 to decrease more slowly than the trailing edge of analog pulse version II. Consequently, the transistor 42 is switched off and the output signal on terminal 26 shifts back to its low value. Thus the trailing edge of an analog pulse has been detected at the same relative level as the leading edge. The advantage of this circuit over the on in FIG. 5 is that in FIG. 6 a shorter delay line is used; on the other hand the comparing circuit 130 in FIG. 6 requires a short recovery time, at least after a strong input pulse, before the capacitor 59 has discharged to the threshold voltage THR.

In the examples of comparing circuits given in the foregoing the transistor 42, which was controlled by pulse version II, was conductive only when version II was greater than all other comparing voltages. The reverse is also possible, as is apparent for example from the detection circuit in FIG. 7. This circuit is an application of the detection system shown in FIG. 1, the comparing circuit being extended with a storage facility. Comparing input I is connected to the base of NPN-transistor 61, the collector of which is connected to +12 volts, the emitter being connected to conductor 64. The latter is connected, via diode 65, to a source of threshold voltage THR of for example +8 volts, and via capacitor 66 to a terminal which is at +6 volts. Furthermore, conductor 64 is connected, via resistance 63, to the emitter of PNP-transistor 62, of which the base is connected to comparing input II and the collector to output 26. Also, the collector of transistor 62 is connected to ground by way of diode 68, and to −12 volts by way of resistor 67. The wave forms appearing during operation of this circuit are represented in FIG. 8.

Initially, before an analog pulse appears at input 12, the comparing inputs I and II of COMP 132 are both at +6 volts. A current flows in a circuit from +8 volts through diode 65, conductor 64, resistor 63, transistor 62, resistor 67, to −12 volts. The voltage $V_C$ on capacitor 66 is now +7.8 volts. Transistor 61 does not conduct. Resistor 63 serves to limit the emitter current of transistor 62. Resistor 67 has been selected so that only a fraction, for example 10%, of the collector current flows by way thereof to −12 volts. Consequently the collector voltage rises to above 0 volts, so that diode 68 is conductive and conducts the rest of the collector current to ground. Therefore the output voltage is now substantially 0 volts. However, if the conduction of transistor 62 would be cut off, the output 26 will suddenly shift from 0 to −12 volts only upon the disappearance of the last 10% of the collector current.

When the leading edge of the attenuated and undelayed version I of an analog input pulse rises above +7.8 volts, transistor 61 goes into conduction. The voltage $V_C$ on capacitor 66 follows the wave form I upwards, until it has reached its peak value. Diode 65 is blocked. Transistor 62 remains conductive, until the delayed but unattenuated pulse version II reaches half its peak value. Now the wave forms I and II are coincident, the emitter and base voltages of transistor 62 have become equal and the conduction breaks off. The transistors 61 and 62 and diode 65 are now all cut off, so that the charge is stored on capacitor 66. The output signal has been shifted to −12 volts. This state is maintained until wave form II has fallen, on its trailing edge, below the stored peak voltage of wave form I. Thereupon transistor 62 goes into conduction and shifts the output voltage on terminal 26 upwards again to 0 volt. Capacitor 66 is discharged via resistor 63 and transistor 62, in consequence of which $V_C$ returns to the threshold value +7.8 volts, restoring the system to the initial state. Now diode 65 is conductive again. FIG. 8 shows the trend of the emitter voltage of transistor 62, represented by the dotted line $V_E$. When no pulse is detected, so that the output signal is high, $V_E < V_C$, current flowing in resistor 63, and $V_E >$ II, transistor 62 being conductive.

Figure 7:
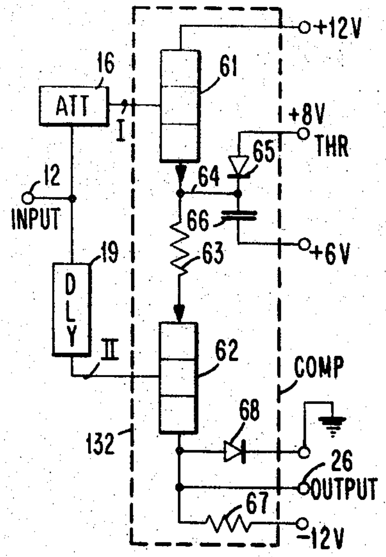
FIG. 7 shows a circuit of a fourth embodiment of the invention.
Figure 8:
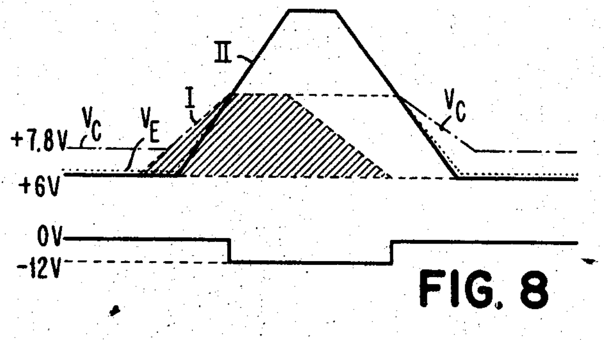
FIG. 8 shows a timing diagram of wave forms appearing in the detection system of FIG. 7.

The circuits shown in FIG. 5, 6 and 7 are preferred embodiments of detection systems according to the invention, shown to illustrate the invention, but not as a limitation of the scope of the invention. Many alterations could be made in the embodiments shown without departing from the scope of the invention. Negative going analog pulses can for example be detected in the manner described by reversing in the circuits described all polarities of voltage sources and rectifying semiconductor junctions.

We claim:

1. A system for detecting analog pulses at the leading and trailing edges thereof, said pulses having varying peak values but uniform rise and fall times, said detection to be performed at a variable level having a fixed relation to the peak value of each individual pulse, said system comprising, in combination, (a) advancing means for deriving a relatively advanced and attenuated version of each pulse, (b) delay means for deriving a relatively delayed and attenuated version of each pulse, (c) and comparing means connected to said advancing means and said delay means for continuously and directly comparing each pulse with both the advanced and the delayed versions of the same pulse and providing an output signal only during the time that said pulse exceeds either the advanced or the delayed versions of the same pulse.

2. A system for detecting the edges of analog pulses at varying peak values, said pulses having uniform edge widths, said system comprising, in combination, (a) a signal input terminal,
(b) a continuous and directly effective amplitude comparator having two inputs and an output,
(c) a first conductive path for connecting said input terminal to one of the comparator inputs,
(d) a second conductive path for connecting said input terminal to the other of the comparator inputs,
(e) attenuating means connected in one of said conductive paths, and
(f) delay means connected in one of said conductive paths, the delay time being selected so that the edge of the unattenuated version of an input pulse emerging from one of said conductive paths coincides with the peak value of the attenuated version of the same input pulse emerging from the other conductive path.

3. A system for detecting analog pulses as claimed in claim 2, in which the first conductive path comprises an attenuator and the second conductive path comprises a delay element, and further including, in said amplitude comparator
(a) a plurality of transistors of the same conductivity type, the base electrodes of the transistors each being connected to a respective one of the comparator inputs, the emitter electrodes all being connected to a common emitted resistor, and the collector electrode of at least one transistor being connected to the output of the comparator,
(b) an additional transistor having its base electrode connected to said first conductive path,
(c) a capacitor having one plate connected to a source of constant voltage and the other plate connected to the emitter electrode of said additional transistor, and
(d) a diode connecting the emitter electrode of said additional transistor to the emitter electrodes of said plurality of transistors.

4. A system for detecting analog pulses as claimed in claim 2, in which the first conductive path comprises an attenuator and the second conductive path comprises a delay element, further including, in said comparator,
(a) a first and a second transistor of opposite conductivity types,
(b) an emitter resistor connected between the emitter electrodes of said first and said second transistors,
(c) conductor means connecting the base electrode of said first transistor to said first conductive path, and connecting the base electrode of said second transistor to said second conductive path,
(d) a diode,
(e) a storage capacitor,
(f) a constant voltage source,
(g) a threshold voltage source,
(h) said storage capacitor having one plate connected to said constant voltage source and having the other plate connected to the emitter electrode of said first transistor and also connected via said diode to said threshold voltage source, and
(i) an output circuit connected to the collector electrode of said second transistor.

5. A system for detecting both edges of analog pulses of varying peak values, said pulse being uniform edge widths, said system comprising, in combination,
(a) a signal input terminal,
(b) an amplitude comparator having three inputs and an output,
(c) a first conductive path including attenuating means between said input terminal and a first input of said comparator,
(d) a second conductive path including a delay element between said input terminal and a second input of said comparator, and
(e) a third conductive path including attenuating means in series with a delay element, between said input terminal and the third input of said comparator,
the delay times of the delay elements in said second and third paths being selected so that the leading edge of a delayed but attenuated pulse emerging from said second path coincides with the peak values of an attenuated undelayed pulse emerging from said first path, and so that the trailing edge of the delayed unattenuated pulse emerging from the second path coincides with the peak value of delayed and attenuated pulses emerging from the third path.

6. A system for detecting analog pulses as claimed in claim 5, in which the amplitude comparator comprises a plurality of transistors of the same conductivity type, the base electrodes of the transistors each being connected to a respective one of the comparator inputs, the emitter electrodes all being connected to a common emitter resistor, and the collector electrode of at least one transistor being connected to the output of the comparator.

7. A system for detecting analog pulses as claimed in claim 6, in which the base electrode of one of the transistors of the comparator is connected to a source of constant or relatively slowly varying threshold voltage.

References Cited

UNITED STATES PATENTS

| | | | |
|---|---|---|---|
| 3,042,873 | 7/1962 | Smith | 328—55 XR |
| 3,149,288 | 9/1964 | Rhodes | 328—56 XR |
| 3,280,345 | 10/1966 | Van Steenis | 307—235 XR |
| 3,280,346 | 10/1966 | Schoute | 307—235 XR |
| 3,293,552 | 12/1966 | Sichak et al. | 328—56 |
| 3,327,230 | 6/1967 | Konian | 307—268 XR |

STANLEY T. KRAWCZEWICZ, Primary Examiner

U.S. Cl. X.R.

307—232, 235, 268; 328—55, 56, 135, 155